United States Patent [19]

Bartle

[11] 4,435,645
[45] Mar. 6, 1984

[54] INFRARED RADIATION SIGNATURE GENERATION SYSTEM

[75] Inventor: Richard S. Bartle, Andover, Mass.

[73] Assignee: Avco Corporation, Wilmington, Mass.

[21] Appl. No.: 378,061

[22] Filed: May 14, 1982

[51] Int. Cl.³ .............................................. G21G 4/00
[52] U.S. Cl. ............................. 250/493.1; 204/157.1 R
[58] Field of Search ................. 250/493.1, 495.1, 504; 219/341, 342; 204/157.1 R

[56] References Cited

U.S. PATENT DOCUMENTS

| | | | |
|---|---|---|---|
| 3,539,811 | 11/1970 | Risgin | 250/493.1 |
| 3,578,974 | 5/1971 | Thomas | 250/493.1 |
| 3,797,395 | 3/1974 | Tyroler | 250/493.1 |
| 3,878,396 | 4/1915 | Vallet | 250/493.1 |

*Primary Examiner*—Bruce C. Anderson
*Attorney, Agent, or Firm*—Abraham Ogman

[57] ABSTRACT

An infrared radiation signature generation system including an enclosed chamber (12), a reactor bed (24) for vaporizing a vapor precursor, a pressure source (16) for introducing the vapor precursor to the reactor bed (24), a valve (22) for controlling rate of flow of vapor precursor to the reactor bed (24), the temperature of the vapor being greater than the ambient temperature surrounding the chamber (12), and at least one manifold (32-33) for distributing the hot vapor to the interior (34) of the chamber (12) at a pressure higher than the ambient pressure. The wall of the chamber (12) is formed of material which allows percolation of vapor therethrough, the percolating vapor transferring heat to the chamber wall and causing a temperature rise therein whereby the chamber wall emits an infrared radiation signature in response to such temperature rise. There is a temperature transducer (40) interrelated with the wall of the chamber and responsive to the temperature thereof for generating a signal whose amplitude varies in relation to such temperature and a rate controller (44) responsive to the signal for controlling the generation rate of hot vapor to maintain the chamber wall at a steady state temperature whereby a continuous infrared radiation signature is generated.

12 Claims, 2 Drawing Figures

INFRARED RADIATION SIGNATURE GENERATION SYSTEM

BACKGROUND OF THE INVENTION

This application describes an invention made or partially made in the course of work under a U.S. Government contract, viz Department of the Air Force Contract No. F04701-78-C-0125. A royalty-free, non-exclusive license has been granted to the U.S. Government to utilize the invention for government purposes.

This invention relates to a system for generating an infrared radiation signature and for controlling such signature over extended time periods.

A number of infrared radiation sources are presently known. In certain of those a hollow black body is heated to emit such radiation by means of complex heating elements. Such systems tend to be inefficient, requiring significant levels of electrical input power. Further, complicated thermal controls are required to regulate the temperature of the radiating surfaces of such black bodies. Maintaining an infrared signature at a constant level is very difficult.

Alternative systems exhibit the spraying of a mixture of heated gas and boiling liquid on the surface of the black body thereby inducing thermal radiation. However, the heating mixture in such systems may also generate infrared radiation which may tend to interfere with the radiation emanating solely from the black body.

Still other black bodies have been provided with modulating devices for allowing emission of selected wavelengths of infrared radiation. Radiation is directed out of an opening in the black body. Such systems do not demonstrate signature generation over the entire surface of the black body. This type of uniform signature generation may be desirable when the system is used in signaling or tracking (such as for missiles) applications.

Furthermore, due to the substantial heat requirements for generating infrared radiation, the source structures (e.g. black body) provided to date have been limited in size.

Therefore, it is an object of this invention to provide an improved infrared radiation signature generation and control system which provides a continuous and reusable infrared radiation signature automatically controllable at any level.

It is a further object of this invention to provide such a system which eliminates nonrepresentative gas radiation interference with the desired black body spectrum.

It is a further object of this invention to provide such a system in which a uniform signature is generated over the entire surface of an emission structure (black body).

It is a further object of this invention to enable infrared radiation signature generation by heating of an object of larger size than hitherto used.

SUMMARY OF THE INVENTION

This invention features an infrared radiation generation system including means defining an enclosed chamber. There are means for generating, at selected rates, a hot vapor having a temperature greater than the temperature of the ambient surroundings of the chamber. There are means for distributing such hot vapor to the interior of the chamber at a pressure higher than the ambient pressure. The wall of the chamber is formed of a material which allows percolation of vapor therethrough. The percolating vapor transfers heat to the chamber wall and causes a temperature rise therein whereby said chamber wall emits an infrared radiation signature in response to such a temperature rise.

This energy-temperature relationship is expressed by the Stefan Boltzmann equation. There are temperature transducer feedback means interrelated with the wall of the chamber and responsive to the temperature thereof for generating a signal whose amplitude varies in relation to such temperature. There are rate controller means responsive to the signal for controlling the generation rate of hot vapor in order to maintain the chamber wall at a steady state temperature whereby a continuous infrared radiation signature is generated.

In a preferred embodiment the means for generating includes a means for vaporizing a vapor precursor such as hydrazine. A typical means for vaporizing includes a reactor bed. There may be means for introducing such vapor precursor to the means for vaporizing such as a pressure source or alternatively a pump. A preferred pressure source for hydrazine includes nitrogen. Typically control valve means responsive to the rate controller means will be provided for controlling the rate of flow of vapor precursor to the means for vaporizing.

The chamber may include a spherical cloth shroud or other porous material. Alternative shapes may be employed. The means for distributing may include at least one manifold. A tank may be included for holding the vapor precursor. All elements of this invention may be enclosed within the chamber. Alternatively manifolds or other means may distribute hot vapor to the interior of the chamber from outside thereof.

Other objects, features and advantages of the invention will be apparent from the following description of preferred embodiments with reference therein to the accompanying drawing in which:

DETAILED DESCRIPTION OF PREFERRED EMBODIMENTS

Figure 1:
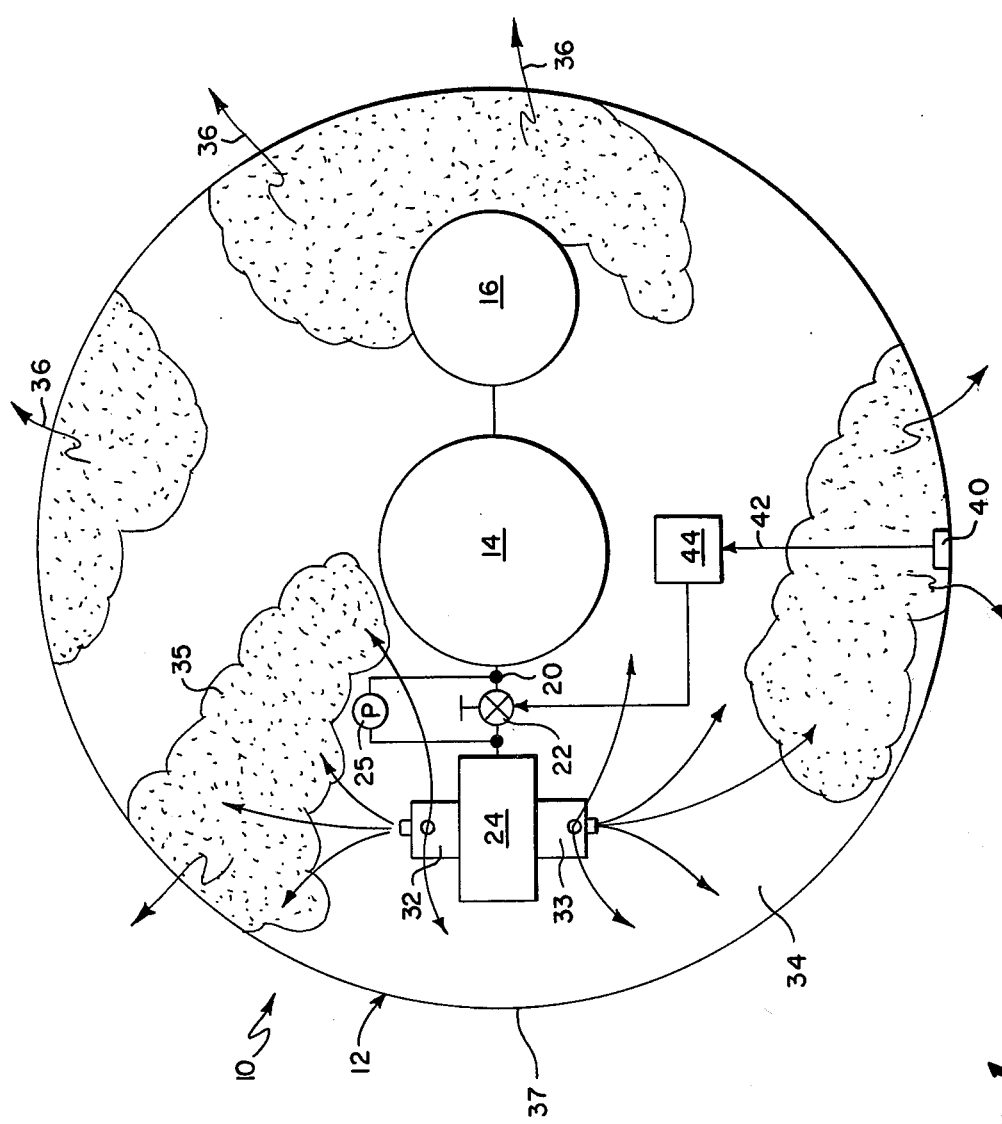
FIG. 1 is a schematic view of the infrared signature generation system of this invention.

There is shown in FIG. 1 a long wave infrared radiation signature generation system 10. A spherical cloth shroud chamber 12 comprises the black body of system 10. Hydrazine vapor precursor is maintained in a tank 14 and is kept pressurized by $N_2$ which is stored in tank 16. This pressure source introduces pressurized hydrazine through line 20 and valve 22 therein to a reactor bed 24. Valve 22 regulates the rate at which hydrazine is fed into bed 24. Note that alternatively to a pressure source, a pump 25 may be provided for introducing hydrazine to bed 24.

Figure 2:
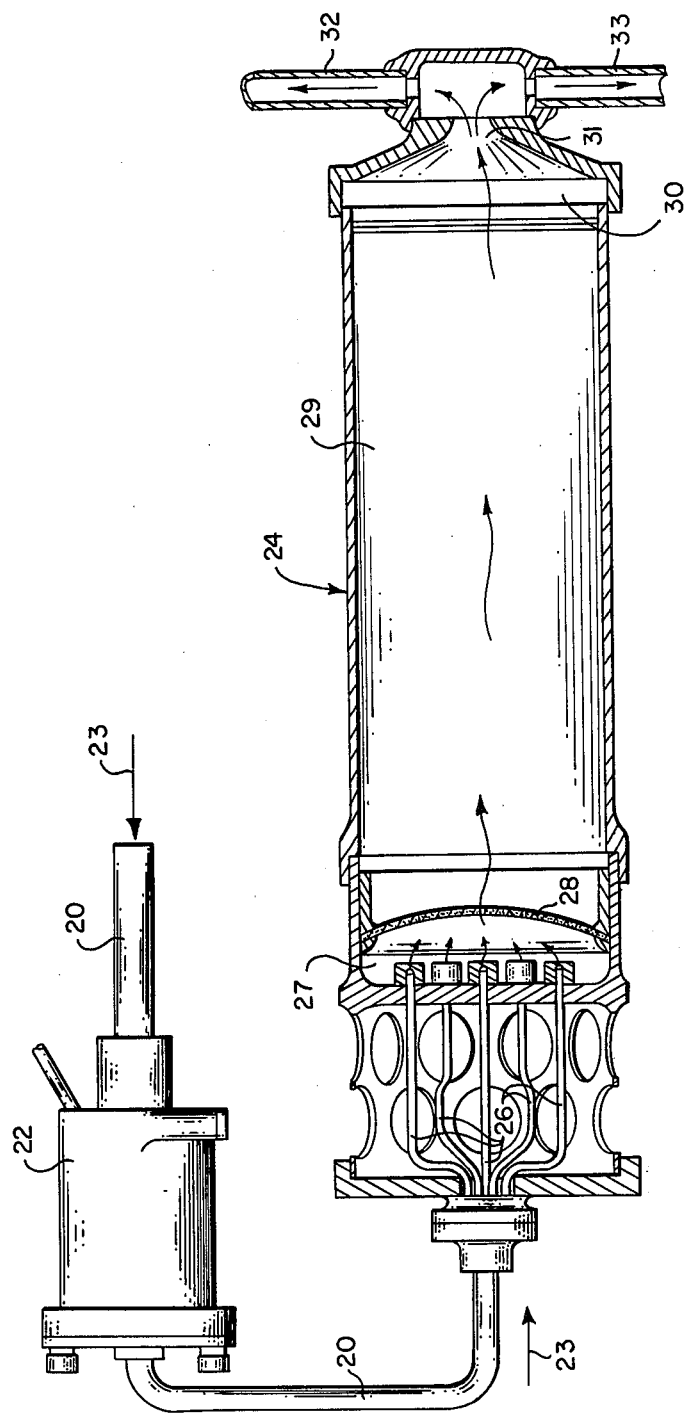
FIG. 2 is a sectional side view showing details of the reactor bed means shown in FIG. 1 for generating a hot vapor.

As shown in greater detail in FIG. 2 hydrazine flows, as indicated by arrows 23, through line 20 and valve 22 and into reactor bed 24 via injection tubes 26. As the liquid hydrazine passes through the bed 24 it is exothermically decomposed into ammonia, hydrogen and nitrogen according to the reaction:

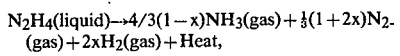

wherein x represents the fraction of dissociated ammonia.

Specifically in the initial catalyst bed 27 approximately 50% (x=0.5) dissociated ammonia is produced. The fuel then passes through a screen 28 and into a second catalyst bed 29 containing Ruthenium where up to 90% (x=0.9) dissociated ammonia is produced. The hot gas product passes through screen 30 and leaves bed 24 through a nozzle 31 which regulates the flow rate of gas product such that it is a function only of up-stream pressure. This hot gas product is uniformly distributed via manifolds 32 and 33 into the interior 34 of chamber 12 (note gaseous clouds 34 FIG. 1) at a temperature greater than the ambient temperature surrounding the chamber and at a pressure higher than ambient pressure.

The cloth shroud of chamber 12, FIG. 1, is porous and the gases eventually percolate therethrough as indicated by arrows 36. The wall of chamber 12 absorbs heat from this percolating vapor and rises in temperature. The outside surface 37 of chamber 12 accordingly emits infrared radiation of a signature commensurate with the temperature of chamber 12. This heat transfer process is very efficient, i.e. the gases 36 leave at the temperature of the wall of chamber 12.

In order to maintain continuous signature emission the chamber 12 must be heated to a steady state temperature, that is the energy loss as radiation is emitted from surface 37 must be continuously replaced by heat from the percolating gases. This steady state temperature is controlled by the rate of hydrazine flowing into reactor bed 24, i.e., the greater the flow rate the higher the temperature of the cloth shroud of chamber 12. To control this rate of flow the following feedback and control system is provided: A temperature sensing transducer 40 monitors the temperature of the cloth shroud. A signal whose amplitude varies with the temperature reading is emitted over line 42 to control logic 44. Logic 44 compares the temperature indicated by the signal from transducer 40 with the desired steady state temperature parameter (which has been programmed or otherwise entered into the logic 44) and operates the flow control valve 22 in the manner required to maintain the wall of chamber 12 at the desired temperature. For example, if the measured temperature is too low the valve 22 is opened to increase the flow rate, increase the hydrazine boiled and thus increase the temperature. Conversely closing the valve 22 will decrease the flow and the temperature. In this manner the steady state temperature and desired infrared signature are maintained. Further, because the control logic 44 may be programmed over a wide temperature range complete infrared signature flexibility is available. Because the heated gas percolates uniformly through the cloth shroud infrared radiation is emitted uniformly from the spherical surface thereof.

The system of this invention is particularly suited for use in military and aerospace applications such as a signaling and target device for missiles or a sea-rescue location target.

It is evident that those skilled in the art, once given the benefit of the foregoing disclosure, may now make numerous other uses and modifications of, and departures from, the specific embodiments described herein without departing from the inventive concepts. Consequently, the invention is to be construed as embracing each and every novel feature and novel combination of features present in, or possessed by, the apparatus and techniques herein disclosed and limited solely by the spirit and scope of the appended claims.

What is claimed is:

1. Infrared radiation signature generation system comprising:
    means defining an enclosed chamber,
    means for generating a hot vapor at selected rates, the temperature of the vapor being greater than the ambient temperature surrounding said chamber,
    means for distributing said hot vapor to the interior of said chamber at a pressure higher than ambient pressure,
    the wall of said chamber being formed of material which allows percolation of vapor therethrough, said percolating vapor transferring heat to said chamber wall and causing a temperature rise therein whereby said chamber wall emits an infrared radiation signature in response to such temperature rise,
    temperature transducer feedback means interrelated with the wall of said chamber and responsive to the temperature thereof for generating a signal whose amplitude varies in relation to such temperature, and
    rate controller means responsive to said signal for controlling the generation rate of hot vapor to maintain said chamber wall at a steady state temperature whereby a continuous infrared radiation signature is generated.

2. System in accordance with claim 1 wherein said means for generating include means for vaporizing a vapor precursor, means for introducing a vapor precursor to said means for vaporizing and control valve means responsive to said controller means for controlling vapor precursor flow rates to said means for vaporizing.

3. System in accordance with claim 1 wherein said chamber includes a cloth shroud.

4. System in accordance with claim 1 wherein said chamber is spherical in shape.

5. System in accordance with claim 1 wherein said means for distributing includes at least one manifold.

6. System in accordance with claim 2 wherein said means for introducing includes a pressure source.

7. System in accordance with claim 2 wherein said means for introducing includes a pump.

8. System in accordance with claim 2 wherein said means for vaporizing includes a reactor bed.

9. System in accordance with claim 2 wherein the vapor precursor includes hydrazine.

10. System in accordance with claim 6 wherein said pressure source includes nitrogen.

11. System in accordance with claim 2 further including means defining a tank for holding vapor precursor.

12. System in accordance with claim 1 wherein said means for generating, means for distributing, temperature transducer feedback means, and controller means are situated within said enclosed chamber.

* * * * *